United States Patent [19]
Miller et al.

[11] 4,382,196
[45] May 3, 1983

[54] TAPE TRANSDUCER

[75] Inventors: G. Kirby Miller, Saratoga; Jon Becker, Milpitas, both of Calif.

[73] Assignee: GTE Products Corporation, Stamford, Conn.

[21] Appl. No.: 244,492

[22] Filed: Mar. 16, 1981

[51] Int. Cl.³ .................... H04R 19/00; G08B 13/16
[52] U.S. Cl. ................................ 307/400; 179/111 E
[58] Field of Search .................... 307/400; 179/111 E

[56] References Cited
U.S. PATENT DOCUMENTS

| | | | |
|---|---|---|---|
| 3,663,768 | 5/1972 | Madsen et al. | 179/111 E |
| 3,705,312 | 12/1972 | Sessler et al. | 179/111 E X |
| 3,809,828 | 5/1974 | Haugsjaa et al. | 307/400 X |
| 4,023,155 | 5/1977 | Miller | 307/400 X |
| 4,041,446 | 8/1977 | Liebermann | 179/111 E X |
| 4,250,415 | 2/1981 | Lewiner et al. | 179/111 E X |

Primary Examiner—Donald A. Griffin
Attorney, Agent, or Firm—John F. Lawler

[57] ABSTRACT

A tape transducer comprising an inner conductive strip laminate sandwiched between and totally enclosed by identical outer conductive strip laminates. The inner laminate has an inner conductive strip having opposite sides to which thin dielectric layers are bonded, the layers being electrically charged to form electrets having electrical charges of the same polarity on their outer surfaces. Each outer laminate has a conductive foil with marginal side portions overlying the side edges of the inner laminate and sealed together. The portions of the outer laminates aligned with the inner laminate are capable of simultaneously moving toward and away from the inner laminate for advantageously generating sonic waves in a transmitting mode and for efficiently generating an electrical signal in a receiving mode.

6 Claims, 4 Drawing Figures

TAPE TRANSDUCER

This invention was made under a contract with the Department of the Air Force.

RELATED APPLICATION AND PATENT

Ser. No. 332,490 filed Dec. 17, 1981 and U.S. Pat. No. 4,344,810.

BACKGROUND OF THE INVENTION

This invention relates to an improved flexible tape transducer.

The electret tape transducer described in U.S. Pat. No. 4,023,155 has the advantages of being flat, flexible and of providing unidirectional object detection capability so that it operates both as an active and as a passive transducer. This tape transducer, however, has a disadvantage in that proper electrical shielding requires that a conducting strip be located on the side of the inner strip opposite from the moving conducting strip and be electrically connected to the latter along the marginal edges. For purposes of discussion, this transducer design can be considered as an upper portion and a lower portion with the inner conducting strip on the boundary between them. The upper portion provides the transduction function while the lower portion is inactive. However, since the basic transducer when used to detect vibrations is a charge generator and since the inactive capacitance of the lower portion is in parallel with that of the active portion, the output voltage of the transducer is reduced by the presence of the shielding strip. For example, if the active and inactive capacitances are equal, the output voltage of the transducer is reduced by 6 dB.

The inactive capacitance may be reduced to a negligible amount by sufficiently increasing the spacing between the shielding strip and the inner strip and by using as a spacer a low dielectric constant material such as plastic foam. The difficulty with this approach is that the thickness of the tape transducer is substantially increased and the flexibility and rollability of the device are substantially reduced. Both of these results are undesirable and in some cases unacceptable. Another disadvantage of this design is the requirement that the center strip have high inertia relative to that of the moving strip. This requirement is achieved by using a thick, heavy metal tape which increases the cost of the transducer.

This invention is directed to an improved tape transducer that overcomes these problems.

OBJECT AND SUMMARY OF THE INVENTION

A general object of the invention is the provision of an electret tape transducer that is highly efficient as a transmitter and as a receiver.

A further object is the provision of a tape transducer that is flexible and relatively thin and therefore is capable of being readily rollable and stored in a minimum of space.

Still another object is the provision of an electret tape transducer in which total electromagnetic shielding is provided without detracting from the radiating or signal generating efficiency of the transducer.

A further object is the provision of a tape transducer that uses light weight conductors and is producible at lower cost.

These and other objects of the invention are achieved with a transducer having an inner conductive strip, outer conductive strips movable relative thereto and positioned on opposite sides thereof, and electret layers between the inner and outer strips, respectively, having electrical charges of the same polarity on their outer surfaces. This produces an electrical reactive force which enhances operation of the transducer both in the transmitting and receiving modes.

DESCRIPTION OF PREFERRED EMBODIMENT

The tape transducer of this invention utilizes two active layers or strips instead of one. Both insulating layers between the center strip and outer strips are poled to form electrets. Any motion of the outer strips with respect to the electrets produces an electrical signal output across the outer and inner strips. By poling the electret layers so that each has the same polarity on the side remote from the center strip, reduction of the spacing from either or both outer strips to the center strip produces the same polarity signal and thus the device is sensitive to pressure. When the tape transducer in the radiation mode is energized to produce sonic or ultrasonic waves, i.e., when a voltage is applied between the center and outer strips, forces are produced on both sides of the center strip that are symmetrical with respect to it. The electrically reactive force enables the use of a thinner, lighter center strip with savings of cost and weight. Moreover the need for dielectric foam or the like for spacing one of the outer strips from the center strip is eliminated thus providing a thin flexible transducer that is easy to handle and occupies minimum space.

Figure 1:
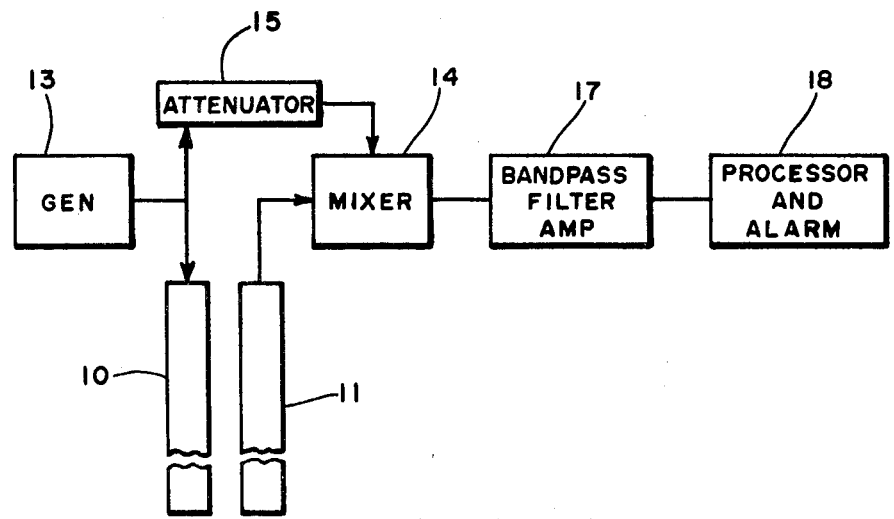
FIG. 1 is a simplified schematic block diagram of an intrusion detection system utilizing a tape transducer of the type with which this invention is concerned.

An electret tape transducer of the type with which this invention is concerned is useful, for example, for transmitting and for receiving ultrasonic waves in an intrusion detection system described in U.S. Pat. No. 4,023,155. A block diagram of such a system is shown in FIG. 1 and comprises electret tape transducers 10 and 11 connected to an AC generator 13 and a mixer 14, respectively. Generator 13 is an oscillator having an output frequency in the ultrasonic range such as 30 KHz and is connected by attenuator 15 to mixer 14. The output of mixer 14 is connected to bandpass filter amplifier 17 which in turn is connected to processor and alarm circuits 18. Transducer 10 functions as a transmitter and propagates ultrasonic waves generally normal to the plane of the tape. Transducer 11 is positioned to receive ultrasonic waves reflected by an object within the range of the system. The electrical output from transducer 11 is passed to mixer 14 which compares the received signal with the generator output and produces an output when there is a difference in these frequencies. This occurs as a result of a doppler shifted frequency produced by a moving object such as an intruder. The output of mixer 14 is applied to amplifier 17 and to processor and alarm circuits 18 to appropriately indicate the presence of a moving object.

Intrusion detection systems are but one application of such electret tape transducers. Other uses for such transducers are distance measurement, position control, or velocity control in industrial processes for which point transducers are suitable.

Figure 2:
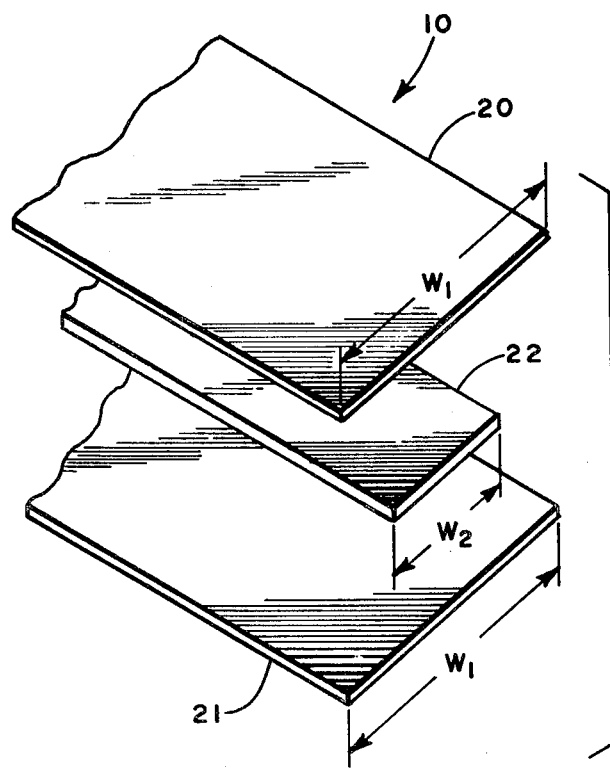
FIG. 2 is an exploded view of the tape transducer showing the three parts thereof.
Figure 3:
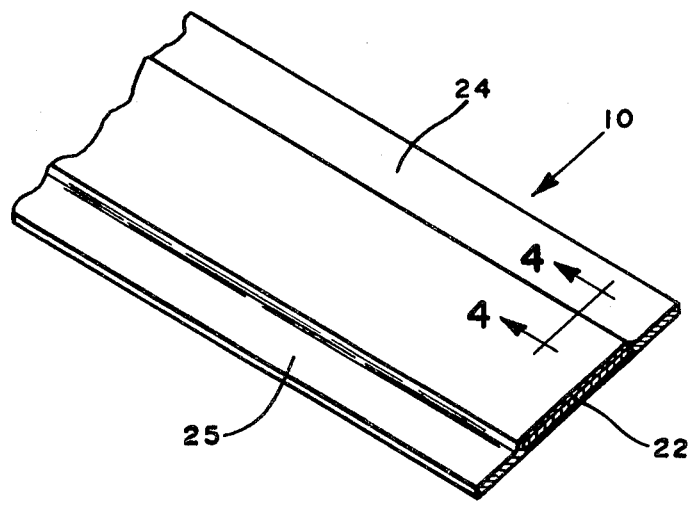
FIG. 3 is a perspective view of a finished tape transducer embodying this invention.
Figure 4:
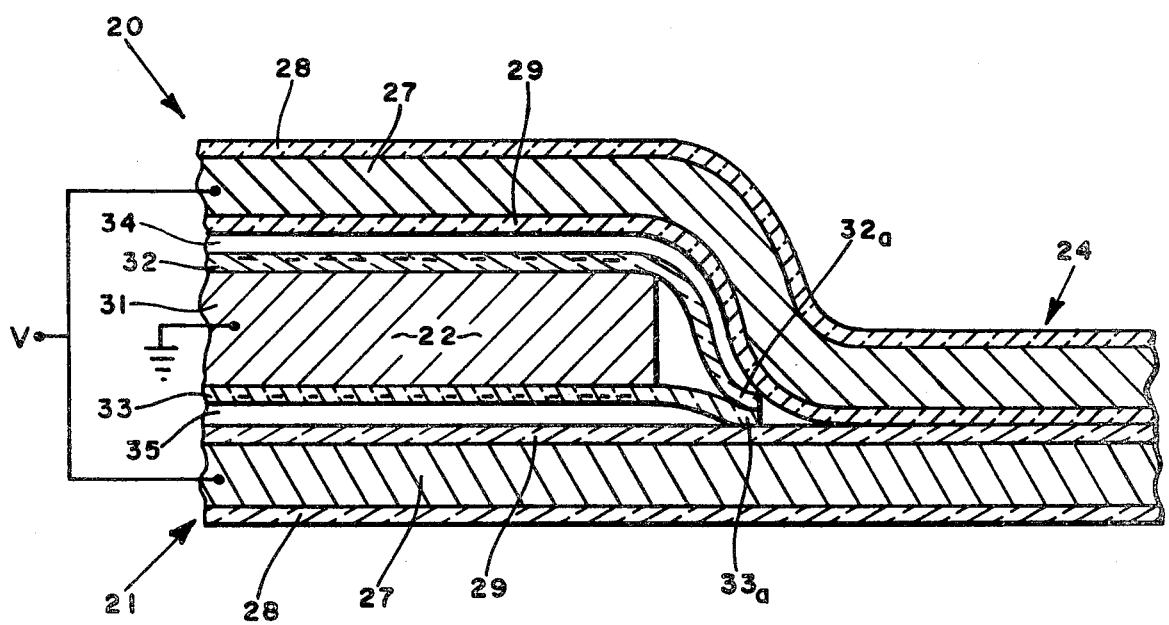
FIG. 4 is a greatly enlarged transverse section taken on line 4—4 of FIG. 3.

The tape transducer 10 with which this invention is concerned is illustrated in FIGS. 2, 3 and 4 and comprises elongated outer strip means or laminates 20 and 21 and an elongated inner strip means or laminate 22 sandwiched between the outer laminates. Outer laminates 20 and 21 have equal widths $W_1$ greater than the width $W_2$ of inner laminate 22 and are positioned symmetrically about the longitudinal axis of inner laminate 22 so that marginal edge portions 24 and 25 of outer laminates 20 and 21 extend beyond the side edges of the inner laminate. The marginal edge portions 24 and 25 are secured or sealed together so that the inner laminate 22 is substantially totally enclosed by the outer laminates 20 and 21.

Outer laminates 20 and 21 are substantially identical in construction and each comprises a foil 27 of a conductor such as aluminum, a thin plastic covering 28 such as the polyester compound Mylar secured to the outer surface of foil 27 and a thin sheet 29 of a plastic compound such as polyethylene. By way of example, outer laminate is approximately 0.003" thick, 1.75" wide and is marketed commercially as heat sealable Mylar tape by Lamart Corporation, Clifton, N.J.

Inner laminate 22 comprises a conductive metal strip 31 having outer surfaces covered with thin dielectric layers 32 and 33 which preferably are slightly wider than strip 31. By way of example, strip 31 is made of copper 0.01" thick and 1.0" wide, and dielectric layers 32 and 33 are made of tetrafluorethylene (Teflon). Laminate 22 is sold commercially by TME Division of Chomerics Corporation, Hudson, N.H.

In the composite transducer shown in FIG. 4, the side edges 32a and 33a of dielectric layers 32 and 33, respectively, are sealed together as received from the manufacturer. In accordance with this invention, the marginal edge portions 24 and 25 of the outer laminates 20 and 21 are also sealed together around inner laminate 22 as shown to substantially totally enclose the latter. Air spaces 34 and 35 exist between inner laminate 22 and adjacent portions of outer laminates 20 and 21, respectively, so that the latter are movable relative to the inner laminate to perform the transduction function of the device.

Dielectric layers 32 and 33 are electrically charged so that the charges on the sides thereof remote from the inner strip 31 are the same. As shown in FIG. 4, for example, the charges remote from strip 22 are negative. This charge distribution in combination with the symmetrical arrangement of the outer laminates 20 and 21 relative to the inner laminate 22 provide enhanced signal output from the transducer when subjected to transverse external forces applied to one or both of the outer laminates and to an enhanced radiation efficiency due to the push-pull effect of the inner laminate on the outer laminates when the latter are connected to a source of alternating voltage.

By way of example, assume the charges on the outer surfaces of electret layers 32 and 33 are minus as shown in FIG. 4. Reduction in the spacing of either or both outer foils 27 from inner strip 31 produces a signal of the same polarity, making the device sensitive to pressure. When a negative voltage V is applied to foils 27 of the outer laminates and inner strip 31 is electrically grounded, the former are pushed outwardly by the electrostatic force and when the voltage V goes positive, foils 27 are forced inwardly. If the lower (as viewed) laminate 21 is immobile because it rests on a solid surface, then any motion produced by the lower laminate supplements motion produced by upper laminate 20. If inner strip 22 were massless, acoustic radiation produced by the transducer would be doubled. However, if strip 22 were somewhat massive, the force from below would oppose that from above so that the effective mass of inner strip 22 as seen from the active upper laminate would be greatly increased. While a requirement in prior devices was that the center conductor be massive with respect to the mass of the moving layer, the transducer described above obtains the desired effective inertia electrically by using an applied rather than a reaction force. This permits the use of a light thin center strip which is required only to be capable of conducting the driving current (when the device is used in the transmitting mode) without overheating.

The composite tape transducer described above is efficiently and continuously made by apparatus described in copending application Ser. No. 244,491 by Becker et al, now U.S. Pat. No. 4,344,810.

What is claimed is:

1. A composite tape transducer comprising
   a metallic inner strip,
   said inner strip having electrically charged dielectric layers bonded to opposite sides, respectively, thereof,
   a pair of metallic outer strips adjacent to and movable toward and away from said layers, respectively,
   each of said outer strips having widths greater than the width of said inner strip,
   said outer strips having marginal edge portions extending beyond the side edges, respectively, of the inner strip, and
   means to secure together adjacent marginal portions of said outer strips.

2. The transducer according to claim 1 in which charges on said dielectric layers remote from said inner strip have the same polarity.

3. The transducer according to claim 1 in which said means constitutes a thin heat sensitive sheet secured to the inner side surface of each of said outer strips.

4. The transducer according to claim 3 in which each of said outer strips has a protective film bonded to the outer surface thereof.

5. The transducer according to claim 4 in which said heat sensitive sheet is a polyethylene compound and said protective film is a polyester resin.

6. An elongated flexible tape transducer adapted to transmit and receive ultrasonic waves comprising
   an elongated electrically conductive inner strip having flat parallel sides and a width substantially greater than its thickness whereby to be flexible in a direction normal to said sides,
   thin dielectric layers secured to opposite sides, respectively, of said inner strip and to each other adjacent to the side edges of said strip,
   said layers being permanently electrically charged with charges having the same polarity remote from said inner strip,
   electrically conductive flexible outer strips coextensive and laterally symmetrical with and adjacent to opposite sides, respectively, of said inner strip, said outer strips having widths equal to each other and greater than the width of said inner strip whereby marginal edge portions of said outer strips extend beyond the side edges of said inner strip, each of said outer strips having plastic sheets secured to the inner sides thereof across the entire width thereof, said sheets being bonded together along said marginal edge portions of the outer strips whereby the latter totally enclose said inner strip, the portions of said outer strips aligned with said inner strip being movable toward and away from said layers, respectively.

* * * * *